United States Patent
French et al.

(12) 
(10) Patent No.: US 6,750,131 B2
(45) Date of Patent: Jun. 15, 2004

(54) METHOD OF IMPROVING THE CONDUCTIVITY OF TRANSPARENT CONDUCTOR LINES

(75) Inventors: Ian D. French, Hove (GB); Pieter J. Van der Zaag, Pyrford (GB); Daan L. De Kubber, Roermond (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/055,356

(22) Filed: Jan. 22, 2002

(65) Prior Publication Data

US 2002/0109800 A1 Aug. 15, 2002

(30) Foreign Application Priority Data

Feb. 3, 2001 (GB) .............................. 0102756

(51) Int. Cl.$^7$ ............................... H01L 21/44

(52) U.S. Cl. .................. 438/609; 438/30; 438/678

(58) Field of Search ..................... 438/29–30, 609, 438/652, 675, 677–678

(56) References Cited

U.S. PATENT DOCUMENTS

| | | | | |
|---|---|---|---|---|
| 4,696,878 A | * | 9/1987 | Shimkunas | 430/5 |
| 6,037,005 A | * | 3/2000 | Moshrefzadeh et al. | 427/286 |
| 6,128,060 A | * | 10/2000 | Shimada et al. | 349/138 |
| 6,498,087 B2 | * | 12/2002 | French et al. | 438/609 |

FOREIGN PATENT DOCUMENTS

| | | | | |
|---|---|---|---|---|
| JP | 6148661 | * | 5/1994 | G02F/1/1343 |
| WO | WO 99/59024 | | 11/1999 | G02F/1/1343 |

OTHER PUBLICATIONS

U.S. patent application Ser. No. 10/265877, French et al., filed Feb. 2003.*
"Conductivity Enhancement of Transparent Electrode by Side–Wall Copper Electroplating", J. Liu et al, SID 93 Digest, pp. 554–557.
"A Novel Four Mask–Count Process Architecture for TFT–LCDs", C.W. Kim et al, SID 00 Digest, pp. 1006–1009.
"A TFT manufactured by 4 masks process with new photolithography", C.W. Han et al, SID Proceedings of the 18$^{th}$ International Display Research Conference, pp. 1109–1112.
Patent Abstracts of Japan, Mitamura Sadao, "Production Of Substrate For Display Device,", Publication No. 06148661, May 27, 1994, Application No. 04301957, Dec. 11, 1992.

* cited by examiner

Primary Examiner—Thanh Nguyen

(57) ABSTRACT

A method of improving the electrical conductivity of transparent conducting lines (32) carried on a substrate (46), particularly address lines on the active plate for a pixellated device such as an active matrix liquid crystal display or the like fabricated using a low mask count process, involves forming the lines on the substrate from a deposited layer of transparent conducting material (53), e.g. ITO, and provided on their upper surface with a covering layer (72') extending from at least one end (75) and partially covering the surface, and then performing an electroplating operation to plate the lines (80) with a plating potential being applied at that end. The covering layer (72') assists in achieving a more uniform plated layer (80) along the length of the line. The covering layer preferably comprises photoresist defined by selective patterning and partial etching of a deposited photoresist layer (54) used for patterning the transparent layer (53). In a pixellated device, pixel electrodes (38) are also defined from the transparent layer.

20 Claims, 8 Drawing Sheets

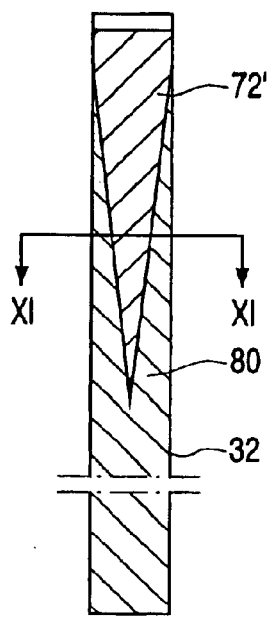
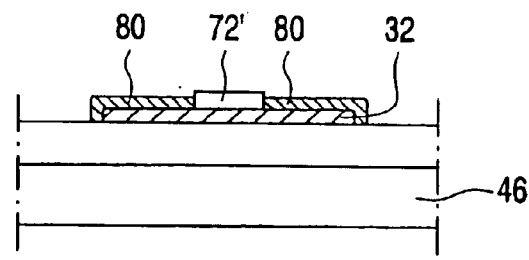
Fig.10  Fig.11
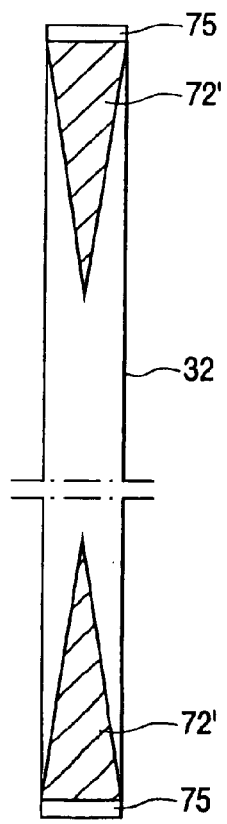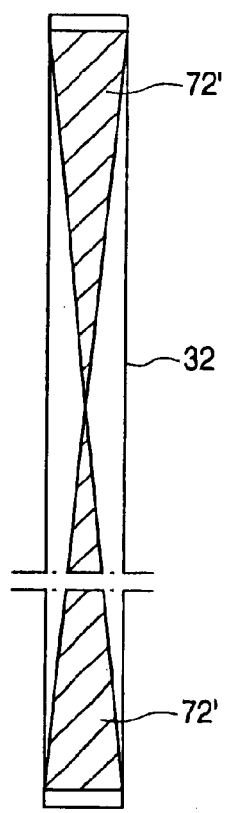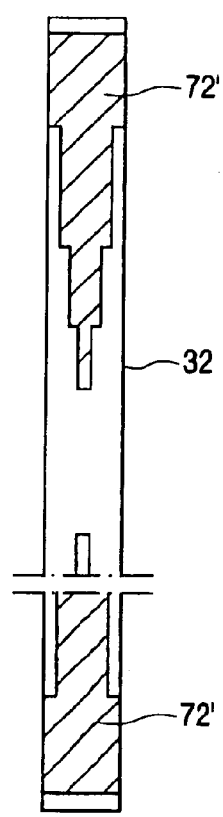
Fig.12A  Fig.12B  Fig.12C

METHOD OF IMPROVING THE CONDUCTIVITY OF TRANSPARENT CONDUCTOR LINES

This invention relates to a method of improving the electrical conductivity of transparent conducting lines carried on a substrate. In particular the invention is concerned with increasing the conductivity of addressing lines comprising transparent conducting material in pixellated devices such as active matrix liquid crystal displays. The invention also relates to the transistor substrate, known as the active plate, used in the manufacture of such displays.

An active matrix liquid crystal display (AMLCD) typically comprises an active plate and a passive plate between which liquid crystal material is sandwiched. The active plate comprises an array of transistor switching devices, typically with one transistor associated with each pixel of the display. Each pixel also has a pixel electrode on the active plate to which a signal is applied for controlling the display output of the individual pixel. Liquid crystal displays may be arranged as transmissive or reflective devices.

FIG. 1 shows the electrical components which make up the pixels of one known example of active plate of an AMLCD. The pixels are arranged in rows and columns. The row address conductor 10 of a pixel is connected to the gate of the TFT 12, and the column address conductor 14 is coupled to the source. The liquid crystal material provided over a pixel electrode of the pixel effectively defines a liquid crystal cell 16 which is connected between the drain of the transistor 12 and a common ground plane 18. An optional pixel storage capacitor 20 is connected between the drain of the transistor 12 and the row conductor 10 associated with an adjacent row of pixels.

For transmissive displays, a large area of the active plate is at least partially transparent, and this is required because the display is typically illuminated by a back light. In conventional display devices, the pixel electrode must be transparent, whereas row and column conductors are formed as metallic opaque lines. Metallic layers, such as chromium, molybdenum, aluminium, alloys or multilayer structures, are used for the row and column conductors because of the high conductivity, which improves the device performance. The conductivity of the lines (usually the column lines) to which the pixel drive signals are applied is particularly important in large displays, because a sizeable voltage drop occurs over the length of the line, making it impossible to drive uniformly all pixels along the line (column).

A problem with the use of metallic column conductors is that separate deposition and lithographic procedures are required to form the column conductors and the pixel electrodes. The pixel electrodes must be transparent, and are typically formed from a transparent conductive oxide film. It is well known that the lithography steps in the manufacturing process are a major contributing factor to the expense of the manufacturing process. Each lithographic step can be considered to reduce the yield of the process, as well as increasing the cost.

A conventional manufacturing process for the active plate of an LCD is a five mask process. With reference to the bottom gate TFT LCD active plate shown in FIG. 2, the process steps, each requiring a separate mask definition, are:

(i) defining the gate 22 (which is part of the row conductor) over the substrate 21;
(ii) defining the amorphous silicon island (which overlies a gate dielectric 23 that covers the entire structure), comprising a lower intrinsic layer 24 and an upper doped contact layer 26;
(iii) defining the metallic source 28, drain 30 and column electrode 32;
(iv) defining a contact hole 34 in a passivation layer 36 which covers the entire substrate; and
(v) defining the transparent pixel electrode 38 which contacts the drain 30 through the hole 34.

The capacitor shown in FIG. 1 may simply be formed from the gate dielectric by providing an area of overlap of one pixel electrode with a portion of the row/gate conductor of the adjacent row.

There have been various proposals to reduce the number of lithography steps, and thereby the mask count, of the manufacture process in order to reduce cost and increase yield.

For example, it has been proposed to form the column conductors from the same transparent conductive oxide film as the pixel electrode, so that these components of the pixel structure can be deposited and patterned together. Additional measures can result in a two mask process, and this is explained with reference to the bottom gate TFT LCD active plate shown in FIG. 3. The process steps, each requiring a separate mask definition, are:

(i) defining the gate 22 (and row conductors); and
(ii) defining the transparent column conductor 32 (which also forms the TFT source 28) and the pixel electrode 38 (which also forms the TFT drain 30).

The definition of the semiconductor island 24, 26 can be achieved by a self-aligned process using the gate 22, for example by using light exposure through the substrate. Of course, the semiconductor could equally be formed with a third mask step (between steps (i) and (ii) above). In the periphery of the array, the gate dielectric 23 is etched away using a low-precision stage, to allow contact to the gate lines at the periphery of the display.

In this structure, the high resistivity of the transparent conductive oxide thin film used for the column lines prevents the use of the structure in large (TV-sized) displays or in higher resolution displays, for example above VGA.

For this reason, there are further proposals to treat the column conductor area of the layer to increase the conductivity, whilst not affecting the transparency of the pixel electrode. One possibility would be to electroplate the top of the conducting lines with a metal but this technique has been found to have problems as, due to the resistive nature of the lines being plated, wide variations in the plating thickness over the length of the line tend to occur. Such thickness variations translate to variations in the LC cell gap which is highly undesirable. The article "Conductivity Enhancement of Transparent Electrode by Side-Wall Copper Electroplating", J. Liu et al, SID 93 Digest, page 554 discloses a method of enhancing the conductivity by electroplating a copper bus to the side of the metal oxide column line. The process involves an incomplete etching process to leave metal oxide residues, which act as seeds for the copper growth. The process is, though, both complicated and difficult to control. In addition, the copper bus will surround the source and drain electrodes, and there is a risk of shorts between the source and drain resulting from fast lateral copper growth when forming the bus. The copper bus around the source and drain electrodes also influences the channel length of the TFT and therefore makes the TFT characteristics unpredictable.

WO 99/59024 discloses a method for enhancing the conductivity of a transparent electrode by providing patterned metallic layers adjacent to the transparent electrodes.

There is still a need for a simple and reliable process for increasing the conductivity of thin film lines of transparent metal oxide layer, such as ITO, without increasing dramatically the complexity of the process. Such a process will find application in active matrix LCD manufacture, but will also be useful for other technologies where mask count reduction could be achieved if a transparent conductive layer could be made to be more conductive at least in certain regions without losing the transparency in others. This may be of benefit for polymer LEDs and large area image sensors.

According to a first aspect of the invention, there is provided a method of improving the electrical conductivity of lines comprising transparent conducting material carried on a substrate, comprising the step of forming the lines of transparent conducting material on the substrate and providing on the upper surface of each of the lines a covering layer extending from an end part of the line and partially covering the upper surface of the line, and the step of subjecting the lines to a metal electroplating process in which a plating potential is applied to each line at the end part whereby a metal layer is plated on the exposed surface area of the line, the covering layer serving to shield the underlying surface of the line during the plating.

With this method, the plating of the transparent conducting material results in much improved electroconductivity of the lines. Importantly, and as a consequence of using the covering layer, the metal plating obtained tends to be smoother and more uniform in thickness along the length of the line compared with the kind of metal plating layer obtained when electroplating lines whose upper surface is completely exposed. This improvement is brought about by the effect of the covering layer in the plating process and results from an understanding of the nature of the electrical currents occurring during the plating and the consequences of such to the plating layer characteristics. The transparent conducting line is basically resistive and when disposed in a plating bath with the one end held at the cathode plating potential with respect to an anode potential of the bath can be considered equivalent to a series of distributed resistances by virtue of which the current flowing through the portion closest to that end tends to be greatest. As the metal deposition rate is proportional to the current flow then plating will be faster at this portion. This in turn results in the portion being made more conductive which accelerates plating, and hence exacerbates the non-uniformity of plating. Consequently, the thickness of the plated layer obtained along the line will be significantly greater towards that end than at regions away from that end. The provision of the covering layer means that, although conduction is still through the whole width of the line at the end region, now only a partial area of the surface is subjected to plating while larger areas are involved away from that end. This means that the resistance of regions away from the end will tend to reduce, leading to enhanced plating. Although there will still be non-uniformity of the plating along the length of the line, the extent of this is considerably diminished.

The covering layer could comprise simply a strip of substantially constant width extending part way along the length of the line. Preferably, however, for better results the layer is shaped such that the uncovered area of the surface of the transparent conducting material of the line increases progressively away from the said end part along the line. The covering layer may be, for example, tapered. Alternatively, the shape of the layer may be such that its width decreases in steps along the line.

Preferably, the plating potential is applied also at an opposite end part of the line and the covering layer is arranged to extend along the line from this opposite end as well in similar manner, thus forming for example a symmetrical covering layer pattern.

The covering layer preferably comprises photoresist material.

Following the electroplating process, the covering insulating layer may be removed from the lines, and thereafter a further electroplating process may be carried out if desired.

The lines of transparent conducting material can conveniently be formed by depositing a layer of transparent conducting material over the substrate, depositing a photoresist layer over the layer of transparent conducting material and patterning the photoresist into a configuration corresponding to the desired lines, and patterning the transparent conducting layer using the photoresist to leave lines of transparent conducting material.

The covering insulating layers could then be provided separately by depositing a suitable layer but this would require a further patterning step to define this layer to the required shape.

In a particularly preferred embodiment, the photoresist layer used for defining the lines of transparent conducting material is used also to provide the covering layer over the lines. To this end, the layer of photoresist may be patterned into portions corresponding to the required lines with each portion including a selected region having a first thickness and corresponding in shape to that required for the covering layer, with the remainder of the portion being of reduced thickness. The defined portions of the photoresist layer are used to pattern the underlying layer of transparent conducting material, through an etching process, to leave the required lines. Thereafter, the portions of photoresist remaining on the lines are partially etched so as to remove a thickness corresponding to that of the reduced thickness areas. This results in photoresist being left at the aforementioned selected regions to constitute the covering layers and the rest of the surface of the line being exposed and ready for the electroplating operation to be performed. The patterning of the photoresist layer to achieve the desired different thickness pattern can be accomplished using a photolithographic patterning process of the kind described by C. W. Kim et al in the paper entitled "A Novel Four Mask—Count Process Architecture for TFT—LCDs", published in SID 00 Digest, pages 1006–1009. The technique described, which is directed to defining TFT channels, uses so-called slit, or grey-tone, photolithography which entails exposing the (positive) photoresist through a photolithographic mask that consists of solid (opaque) areas, transparent areas, and areas with grid or slit patterns. The solid and transparent areas serve to define regions intended to be left (at full thickness) and removed respectively while the areas comprising slit patterns result in partial exposure which upon development of the photoresist leads to the areas concerned being left but with a reduced thickness.

By utilising the photoresist material to form the covering insulating layer in this manner, the number of mask steps required is kept low.

The metallic, plated, layer preferably comprises copper or silver and the transparent conducting layer preferably comprises a conductive oxide, such as ITO (Indium Tin Oxide).

The method of increasing the conductivity of transparent conducting lines is particularly useful in the manufacture of pixellated devices such as liquid crystal displays (both active matrix and passive type), LED displays, PDP (Plasma Display Panel) displays and image sensors, in which the lines are used for addressing purposes. In such devices, transparent pixel electrodes associated with the lines can conveniently be formed from the same transparent conducting layer used for the lines and defined using the same photoresist layer by suitable patterning of that photoresist layer. Preferably, photoresist material remains on the pixel electrodes during the electroplating operation in order to shield the pixel electrodes. In the preferred embodiment described above in which the photoresist is patterned to different thicknesses, then full thickness photoresist may be defined over the pixel electrodes so that photoresist still remains over the electrodes following the partial etch step.

According to a second aspect of the invention, there is provided a method of forming an active plate for a pixellated device, comprising:

depositing and patterning a gate conductor layer over an insulating substrate;

depositing a gate insulator layer over the patterned gate conductor layer;

depositing a silicon layer over the gate insulator layer;

depositing a transparent conductor layer over the silicon layer;

depositing and patterning a photoresist layer over the transparent conductor layer having a configuration defining source and drain areas, pixel electrode areas and conductor line areas associated with the source or drain conductors;

patterning the transparent conductor layer using the photoresist to form source and drains, pixel electrodes and conductor lines;

defining the photoresist to leave a photoresist region on each conductor line extending from one end part of the line partially covering the surface of the line;

and selectively electroplating the exposed areas of the transparent conductor lines with a metallic layer with a plating potential being applied at the end part of each line.

The photoresist layer is preferably patterned into areas of different thickness at the conductor lines and the step of defining the photoresist comprises partially etching the photoresist to remove the thinner areas. This method can enable a two mask process to be used, wherein the gate conductor is deposited and patterned with a first lithographic process and the photoresist layer is deposited and patterned with a second lithographic process, the silicon layer being self aligned to the gate conductor.

Embodiments of the invention will now be described in detail, by way of example, with reference to the accompanying drawings, in which:

FIGS. 6, 8 and 10 are plan views of a typical conductor line of the active plate at different fabrication stages;

FIGS. 7, 9 and 11 are sectional views along the lines VII—VII, IX—IX and XI—XI in FIGS. 6, 8 and 10 respectively;

Figure 13:
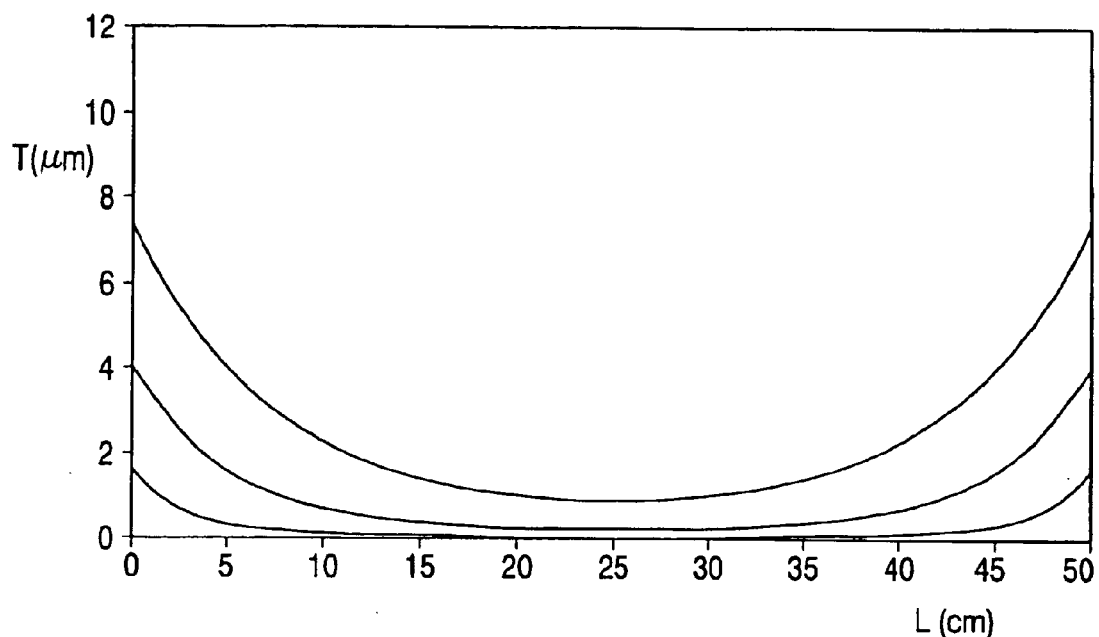
Figure 14:
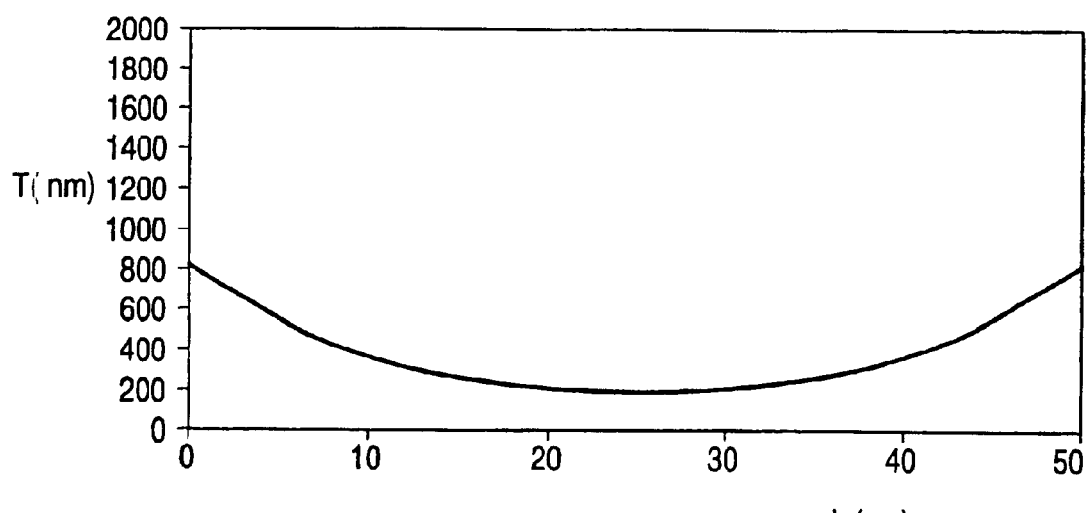
Figure 15:
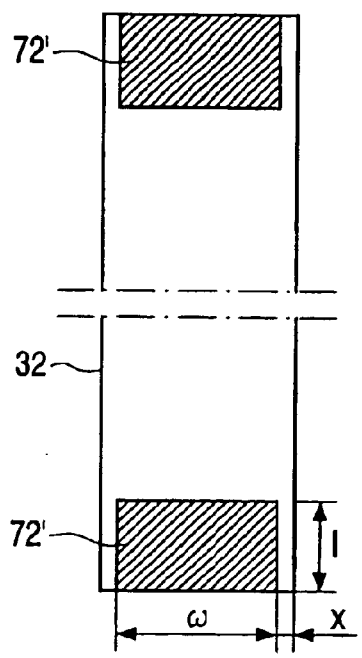
Figure 16:
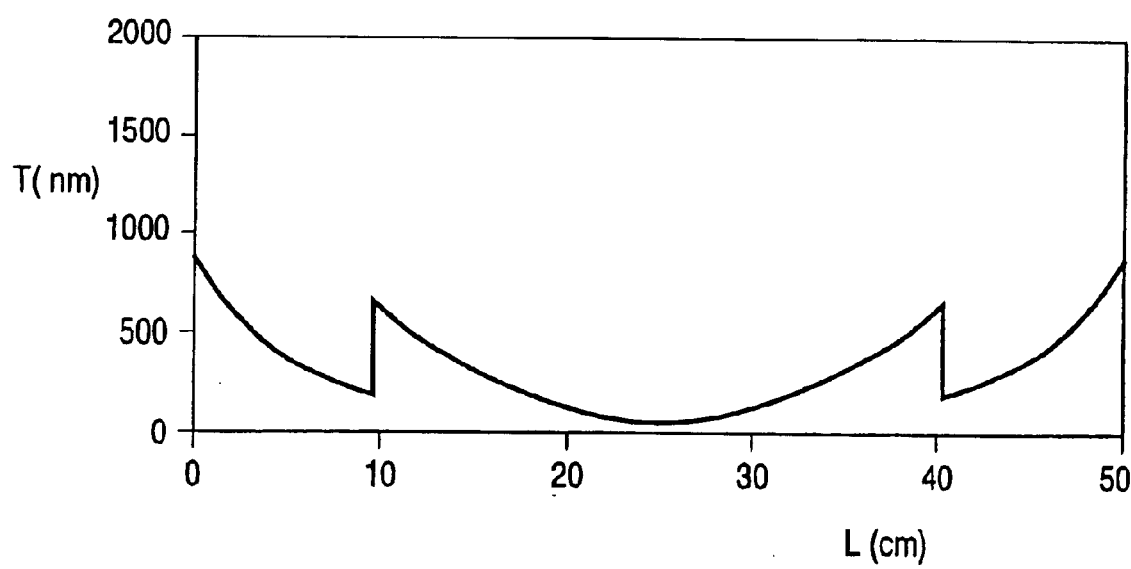

FIGS. 12A, B and C illustrate schematically in plan view alternative forms of conductor line formation;

FIG. 13 is graph illustrating a relationship between an electroplated layer thickness and position along a conductor line using a known electroplating process;

FIG. 14 is a graph illustrating a relationship between an electroplated layer thickness and position along a conductor line when using a method according to the invention;

FIG. 15 is a plan schematic view of a further alternative form of conductor line formation; and FIG. 16 is a graph illustrating a relationship between an electroplated layer thickness and position along a conductor line using the conductor line formation of FIG. 15.

It should be noted that the figures are diagrammatic and not drawn to scale. Relative dimensions and proportions of parts of these figures have been shown exaggerated or reduced in size, for the sake of clarity and convenience in the drawings. The same reference numbers are used throughout the Figures to denote the same or similar parts.

The application of the invention to a low mask count process for manufacturing the active plate of an active matrix liquid crystal display will now be described with reference to FIGS. 5A to 5H which illustrate the manufacturing process at various stages. The first steps of the process are common with known 2-mask processes.

Figure 1:
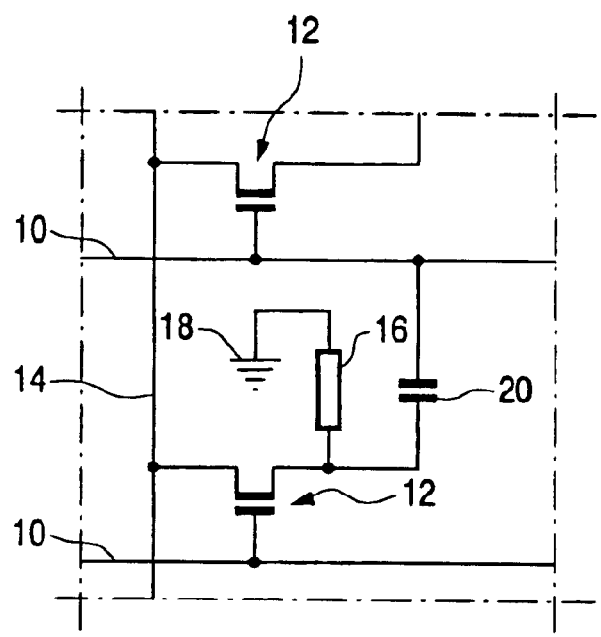
FIG. 1 shows the pixel components of an active plate.
Figure 5A:
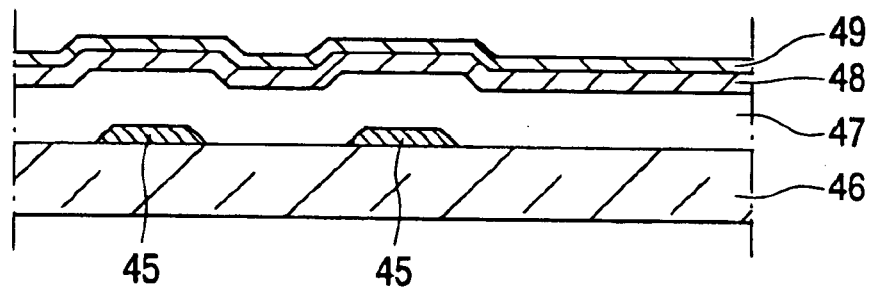
FIGS. 5A to 5H show various stages in the manufacturing process for manufacturing the active plate of an LCD display using the invention.

FIG. 5A is a schematic diagram of the first stages of a low mask count process. The gate metal 45, for example comprising Cr, Al, Mo or combinations of such, has been deposited and defined over the insulating substrate 46 using a wet or dry etching technique, and a standard Back Channel Etch TFT stack deposition carried out. This provides a silicon nitride gate insulator layer 47, an amorphous silicon layer 48 and a doped (n+) silicon layer 49, which acts as a contact face, which are provided over the entire substrate surface. The area to the right of FIG. 5A will be used to form the switching transistors (12 of FIG. 1) associated with the display pixels whereas the left part of FIG. 5A will form the row lead-in areas, where driving signals can be applied to the row conductors. Typically, the SiN gate insulator 47 is 400 nm thick, the intrinsic amorphous silicon 48 is 160 nm thick and the doped amorphous silicon is 40 nm thick, although other thickness layers can be used. The doped silicon layer 49 may be microcrystalline silicon to give good quality ITO to silicon contacts.

Figure 5B:
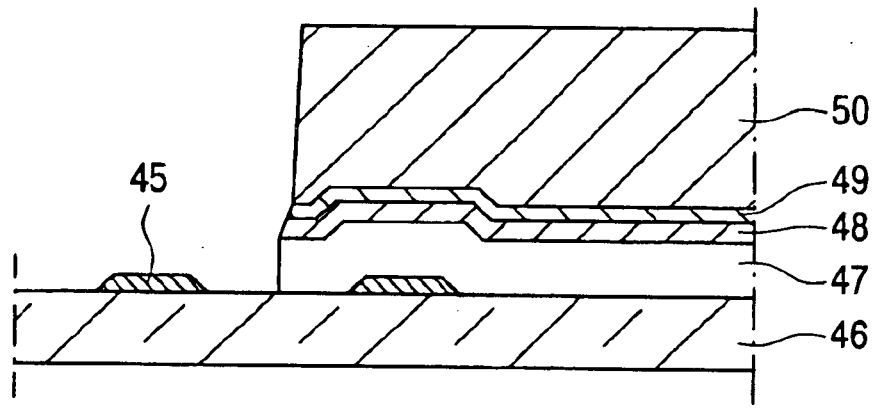
Figure 5C:
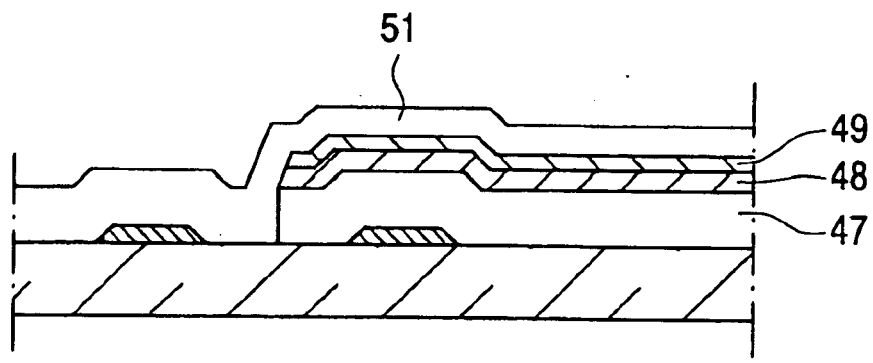

The TFT stack must be etched away from the row lead-in area. This only requires coarse alignment and no fine features to be etched. This masking step could be carried out by printing, laminating a plastic sheet on the array area before etching, or using coarsely aligned printed photoresist 50, as shown in FIG. 5B. In FIG. 5C, the TFT stack has been etched away from the row lead-in area, and a positive photoresist 51 is applied to the whole plate.

Figure 5D:
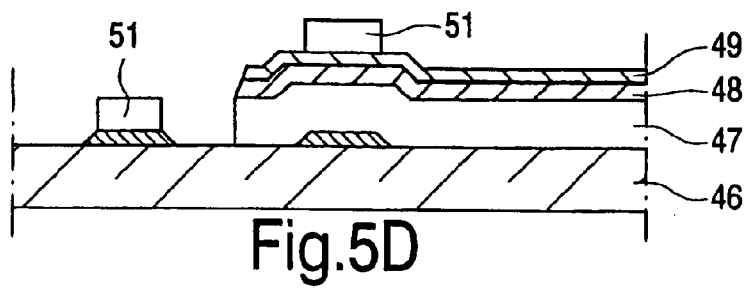
Figure 5E:
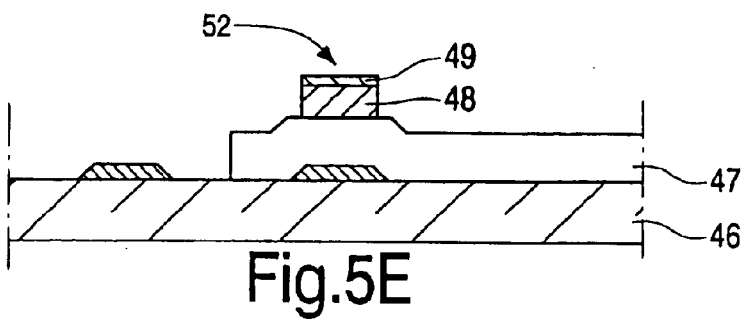
Figure 5F:
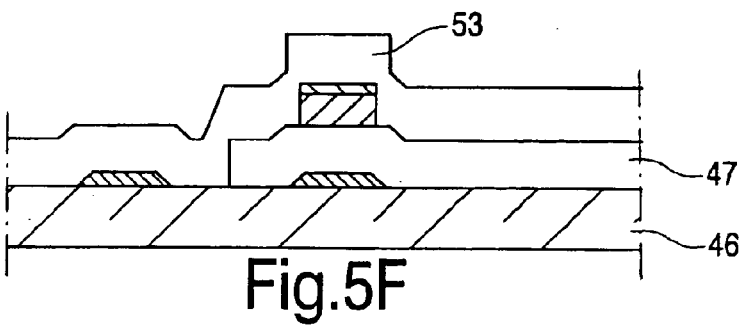

Rear illumination is then used to pattern the positive photoresist to have the same pattern as the gate line structure, as shown in FIG. 5D. The remaining photoresist layer is used to pattern the two silicon layers to leave the transistor channel area 52 in FIG. 5E and regions overlying the gate line (row conductor) structure elsewhere. A transparent conducting layer 53, for example sputtered ITO, is then applied over the whole plate, as shown in FIG. 5F.

Figure 3:
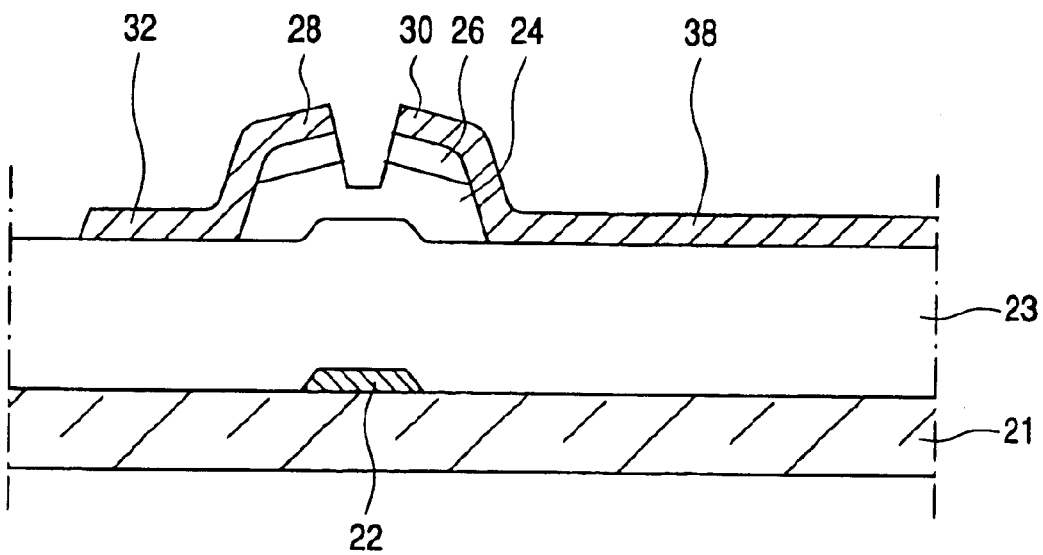
FIG. 3 shows a proposed active plate using bottom gate TFTs and manufactured using a two mask process.

The transparent conducting layer 53 is used, as will be described subsequently, to provide source and drain contacts for the TFTs, transparent pixel electrodes, and thin film column address lines. Referring again to FIG. 3, this layer will thus form a TFT source contact 28 coupled to an associated column conductor line and a TFT drain contact 30 connected to a respective pixel electrode 38. An overlap between the pixel electrode and a gate conductor (row) line 45 can provide, together with the intervening gate dielectric, a storage capacitor (FIG. 1) if required.

The steps illustrated in FIGS. 5A to 5F generally follow a known method.

In order to improve the electrical conductivity of the thin film column lines, these parts are selectively electroplated with a metal in a manner which will now be described.

Figure 5G:
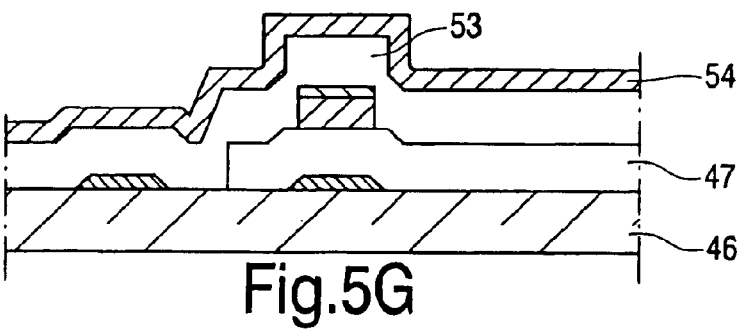
Figure 5H:
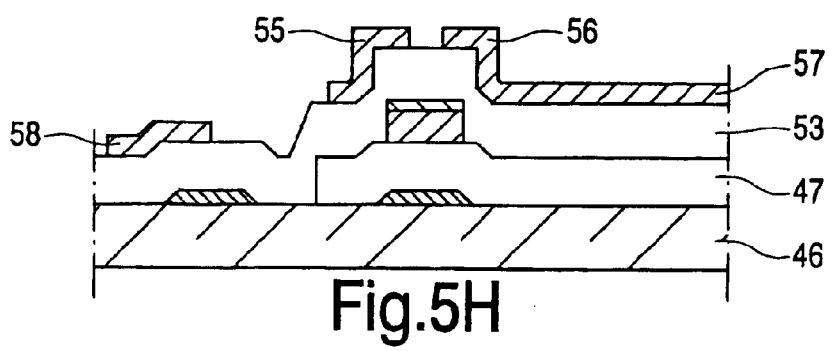

Referring to FIG. 5G, a positive photoresist layer 54 is deposited completely over the structure on the substrate 46. This layer 54 is patterned into a configuration to define the components to be formed from the layer 53, namely a configuration comprising areas 55 and 56 corresponding to the source and drain contact areas, areas 57 corresponding to the pixel electrodes, and areas 58 corresponding to a row lead-in pattern, as shown in FIG. 5H, and also the column lines, not visible in FIG. 5H, integrally coupled with the source contacts 55. Regions of the layer which are not covered by the patterned photoresist are then etched away, using a wet or dry etch process.

The photoresist layer 54 is patterned in a known, but unconventional, manner so as to leave photoresist in selected areas with different thicknesses. Examples of a suitable photolithographic patterning technique are described in the aforementioned paper by C. W. Kim et al and in the paper by C. W. Han et al entitled "A TFT manufactured by 4 masks process with new photolithography", published in SID Proceedings of the 18th International Display Research Conference, (Asia Display '98), pages 1109–1112, to which reference is invited and whose contents are incorporated herein as reference material. The patterning process entails exposing the photoresist layer 54, here a positive type photoresist, through a mask consisting of light-blocking areas, transparent areas and areas with predetermined grid or slit patterns. The light-blocking and transparent areas, as in conventional masks, serve to define respectively regions of the photoresist which are to remain and which are to be removed. The areas comprising a pattern of slits are used to define partially exposed regions, the parameters of the patterns required for this objective being described in the paper. This partial exposure, which relies upon diffraction effects produced by the slits, results in the regions of the photoresist concerned remaining after development of the photoresist but at a reduced thickness compared with the full thickness regions defined by the light-blocking areas of the mask. Essentially, therefore, the technique enables a photoresist layer to be selectively patterned into regions having different; and controlled, thickness as well as providing areas where the resist to totally removed. The areas 55, 56, 57 and 58 in FIG. 5H are all defined by light-blocking areas of the mask, and consequently comprise full-thickness photoresist regions. The column lines, on the other hand, are defined using in addition slit pattern areas in the mask so as to result in a particular structure of different thicknesses of photoresist.

Figure 6:
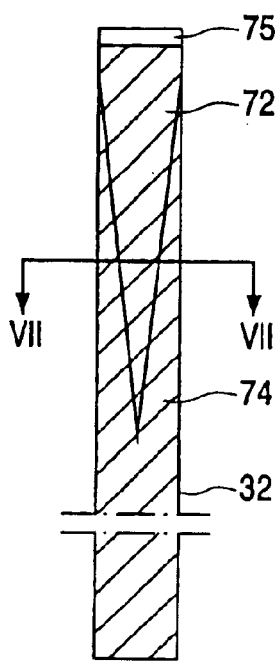
Figure 7:
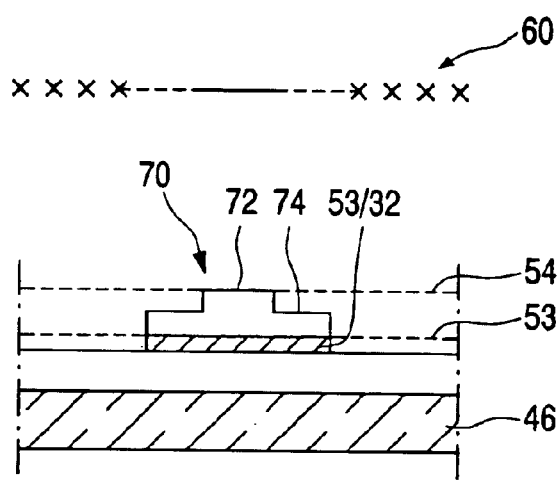

FIG. 6 shows schematically in plan view part of a typical one of the column lines 32 at this stage in the fabrication process and FIG. 7 is a cross-sectional view along the line VII—VII of FIG. 6. The column line 32, comprises an elongate strip of the transparent conducting layer 53, having substantially constant width and thickness along its entire length, and is defined by an area 70 of the photoresist layer 54 after patterning. This area 70 of the photoresist layer, indicated in FIG. 6 by hatching, consists of a first region 72 formed by a light-blocking area of the mask used to pattern the layer 54 and a second region 74 of reduced thickness photoresist formed by a slit pattern area of the mask. The portion of the mask used to pattern the photoresist layer in this way is depicted schematically at 60 in FIG. 7 with the light blocking, transparent and slit pattern areas represented by a solid line, crosses, and dashed lines respectively.

The shape of the first region 72 of the two-level resist pattern 70 is carefully controlled for reasons which will become apparent. As seen in FIG. 6, the region 72 extends from one end part 75 of the line 32 towards the opposite end and partially covers the surface of the line. The region 32 is shaped such that the extent of the area of the surface of the line 32 covered by the region 72 decreases away from the end part 75, in this case with the region 72 being progressively tapered and symmetrical around a centre line of the line 32, and, conversely, such that the area of the surface of the line covered by the thinner photoresist region 74 progressively increases.

Figure 8:
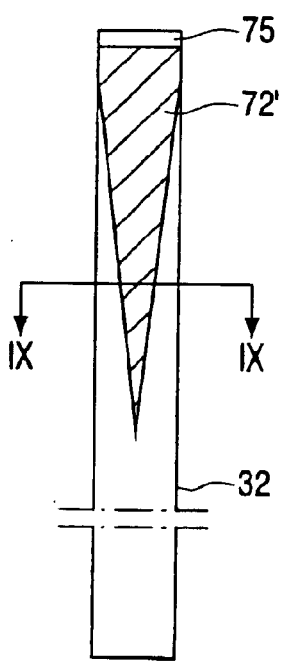
Figure 9:
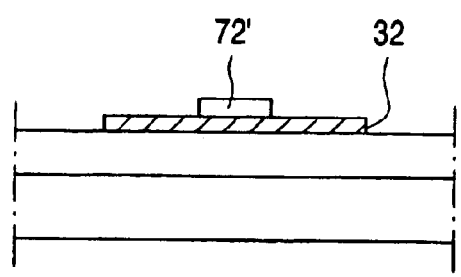

The photoresist pattern is then subjected to a partial etching operation in which a thickness of the resist pattern corresponding to the thickness of the thinner region 74 is completely removed, resulting in the structure shown in the plan and sectional views of FIGS. 8 and 9. The first region 72 of resist, now with reduced thickness, is still present on the line as shown at 72', while the rest of the surface of the line 32 is now exposed. As mentioned earlier, the regions 55, 56, 57 and 58 of the photoresist layer corresponding to the source and drain contacts, pixel electrodes and row lead-in pattern respectively (FIG. 5H) are of full-thickness resist and consequently remain after this partial etching, although with reduced thickness.

The transparent conducting column lines 32 are then subjected to a selective electroplating process in which a layer of metal is plated on their exposed surfaces. Copper is preferably used for this purpose although other metals, such as silver, can be used instead. Before this selective plating, the exposed areas of the transparent conducting lines may be pre-treated, for example using a reductive process in acid or neutral electrolyte. For the electroplating, a required cathode plating potential is applied to the end part 75 of each line 32, the end of the line being kept free of photoresist for this purpose. The electroplating process results in a metal layer being formed on the exposed surface of the line, with the resist region 72' serving as a shield preventing plating of the immediately underlying surface area. This shown in FIGS. 10 and 11 where the metal plating is referenced at 80.

The presence of the protective resist region 72' on the lines 32 during this process ensures that a smoother and more even plating is obtained than would be the case otherwise. Due to the resistivity of the material (e.g. ITO) used for the lines 32 and the resulting inhomogeneous distribution of current, then non-uniformities tend to occur in the plating layer with the rate of plating, and hence the plating thickness, being much greater towards the end of the line where the plating voltage is applied. Typically, there may be a factor of ten or more difference in the plating thickness close to and remote from that point for an uncovered line when electroplated.

The rate of metal deposition is proportional to the electrical current flow. The line 32 can be considered equivalent to a series of distributed resistances connected at one end to the cathode potential and at a number of spaced locations along the length of the line to the plating anode via a resistance constituted by the resistance of the electrolyte. Then, unless the resistance of the line 32 at a region close to the cathode is much less than the resistance of the electrolyte the current flow in the line at this region will be much greater than that further away from the cathode. In the case, therefore, of an uncovered line being electroplated, this larger current in the line at the region towards the cathode will result in a thicker plating deposition. As the plating metal is more conductive than the line 32 then the resistance of this end region rapidly decreases which leads to a still further increase in deposition, thus aggravating the problem and causing even greater non-uniformity in the thickness of the plating layer along the length of the line 32.

The presence of the covering layer 72' serves to control this kind of effect by, to an extent, affecting the distribution of currents with the result that the extent of non-uniformity in the plating layer thickness is considerably reduced. Initially, the structure presents a kind of distributed resistance pattern similar to that described, with electrical conduction being through the whole width of the line 32 at the region partially covered by the layer 72'. Now, however, only partial plating of the area of line 32 at the beginning of the line, occurs, corresponding to the reduced area which is exposed, while the larger surface areas begin to plate further along the line. Through this, the effective resistance of the areas of the line further away from the end tend to reduce compared with the end region. This leads to an improved plating thickness characteristic along the line. There will still be some non-uniformity in thickness, but much less than that obtained when plating an uncovered line. The end region of the line will tend to have the largest degree of non-uniformity but this can be avoided by the use of an appropriate mechanical masking shield positioned to overlie the end part during the plating process.

The shape of the protective resist region 72' on the line, and thus the exposed area of the line, is selected with this in mind.

Rather than the plating voltage being applied to just one end of the line, and the resist region 72' as shown in FIGS. 8 and 10 simply decreasing in area gradually from that one end, it can instead be applied to both ends of the line 32. In this case, the shape of the resist region 72' is changed accordingly so as to be substantially symmetrical around a line through the middle of the line 32, as shown schematically in FIG. 12A. Possible alternative forms for the resist covering layer are illustrated also in FIG. 12B, in which the extent of the covering layer along the length of the line 32 is increased, and in FIG. 12C in which the width of the covering layer is stepped rather than being smoothly tapered.

Although particular forms for the covering layer have been depicted, it will be understood that the shape and dimensions of the layer can be varied and will be dependent on, and to an extent determined by, for example the properties of the line 32 and the plating process parameters. These factors will be taken into account in selecting the form of the covering layer required to achieve the desired results. Generally, speaking, the covering layer is likely to extend over a significant proportion of the length of the line in order to obtain the best results.

FIG. 13 is a graph showing the relationship between the thickness, T, in micrometers of a copper plating layer and the position, L, along the length of the line which can be expected when formed by electroplating on the surface of a plain ITO line without any covering resist in the case where the plating voltage is applied to both ends of the line during the plating process. The different curves shown in the graph are the results for different plating times, ranging from around 50 seconds for the thinnest to around 200 seconds for the thickest. The ITO line is 50 cms long and has a constant width of 20 µm. As regards the key plating parameters used in this example, the bath conductivity is selected to be approximately 40 $\Omega^{-1}m^{-1}$, the currently density (J) is selected to be approximately 1 A/dm$^2$ (=100 A/m$^2$), and the anode-cathode (line 32) distance is approximately 50 cm. As is apparent, the thickness of the copper plating obtained can be as much as ten times greater or more towards the ends than at the middle (25 cm) of the ITO line.

For comparison, the graph shown in FIG. 14 illustrates similarly the relationship between the thickness T, in nanometres, of the Cu plating layer and position, L, along a similarly dimensioned ITO line which can be expected when the line has a protective resist region 72' on its surface of the form depicted in FIG. 12A. The plating parameters remain the same as before. The curve shown in this graph corresponds to a plating time of approximately 800 seconds. The opposite end parts of the line 32 have here been deliberately mechanically shielded during the plating process to avoid the significantly increased plating thickness which would otherwise occur at the very ends. As is evident, the variation in plating thickness along the length of the line is considerably less pronounced.

From the results illustrated in FIGS. 13 and 14, it will be appreciated that at comparable average thicknesses, the variation in thickness along the length of the line 32 in the FIG. 14 case is only around a factor of three or so while in the FIG. 13 case this variation is up to around a factor of ten.

The thickness of the plating layer obtained desirably is at about 100 nm at the thinnest part, i.e. around the middle of the line, and preferably between 100 nm and 500 nm.

Improved results in the plating layer characteristics are possible even when using a much simplified shape of resist region 72'. FIG. 15 shows an ITO line 32, again of 50 cms length and 20 µm width, having simply rectangular resist regions 72' provided at its opposing ends (using the same process as previously described). Each of the two regions has a width (w) of 18 µm and a length, l, of 10 cm and is arranged centrally of the ITO line such that 1 µm width strips, x, of exposed ITO are present at either side. The graph of FIG. 16 illustrates the kind of plating thickness characteristic which can be expected to be obtained when plating such a line using the same electroplating parameters as before.

Referring now again to FIG. 10, then after the plating layer 80 has been formed, the remainder of the photoresist pattern, i.e the region 72', is removed.

At the end of the fabrication process, the ITO column lines have a layer of copper on their surface which provides the higher conductivity required for addressing large, high resolution displays.

When the enhanced conductivity columns are used with a low mask count technology, as shown in the embodiment above, then the amorphous silicon lying above the rows lines may introduce parasitic TFTs that could affect the driving of the display. The effect of these can be accommodated in the driving scheme, and they can be minimised by careful design.

Figure 4:
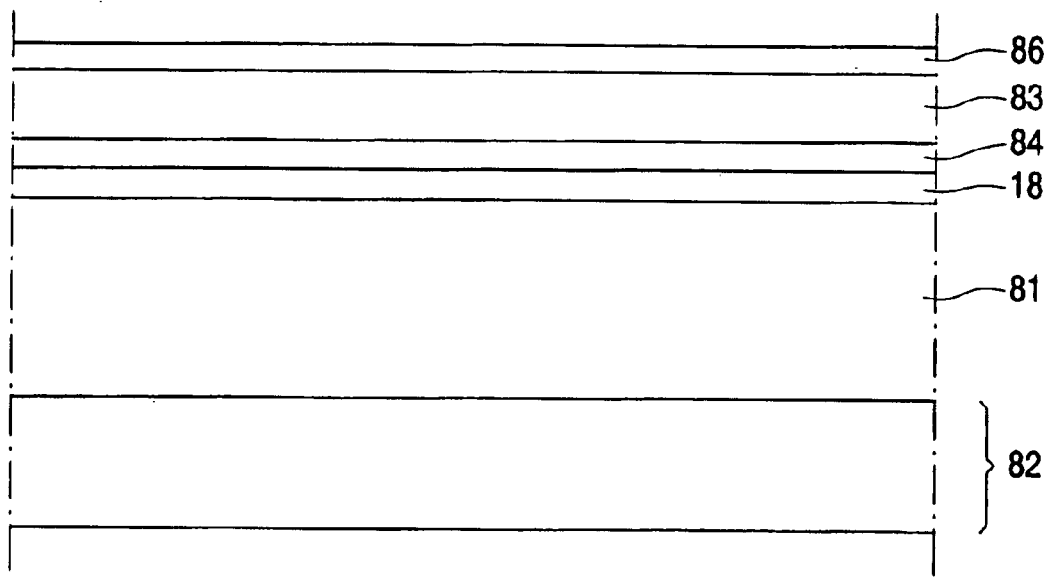
FIG. 4 shows the structure of a complete liquid crystal display.
Figure 2:
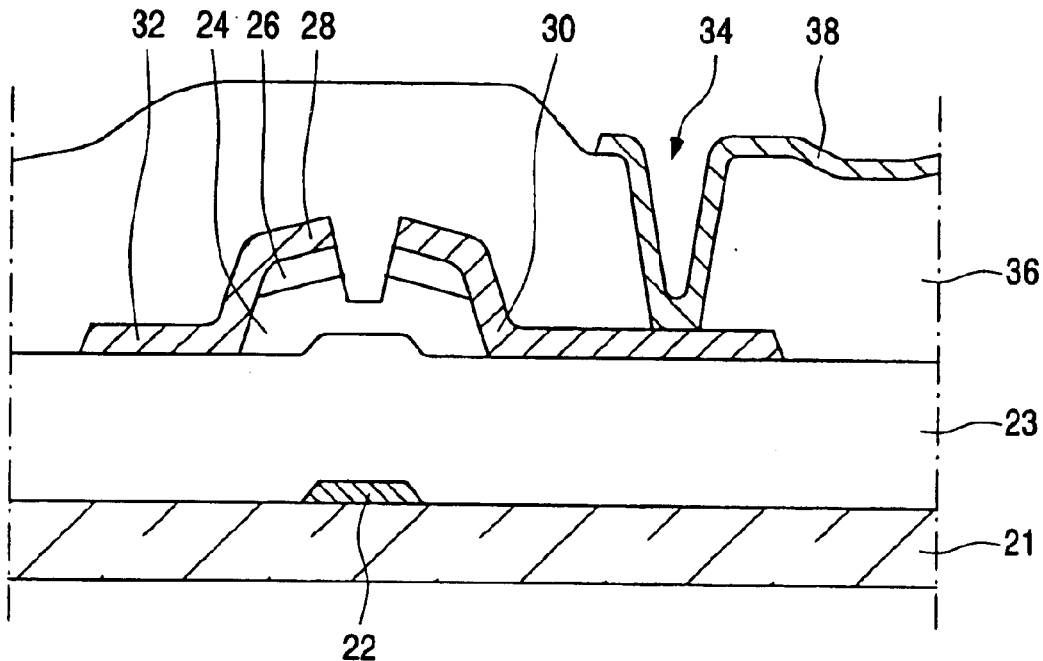
FIG. 2 shows a conventional active plate using bottom gate TFTs and manufactured using a five mask process.

FIG. 4 shows the structure of a complete liquid crystal display. A layer of liquid crystal material 81 is provided over the active plate 82, which comprises the structure described above. A further substrate 83 overlies the layer of liquid crystal material. This further substrate 83 may be provided on one face with an arrangement of colour filters 84 and a plate defining the common electrode 18 layer (shown in FIG. 1). Polarizing films 86 are also provided on the opposite sides of the substrates.

As this embodiment of the invention is concerned principally with the transistor substrate and its fabrication, the operation and construction of the liquid crystal display will not be described in any further detail. Such aspects will be apparent to those skilled in the art.

The specific examples described provide Cu plating on ITO transparent column lines. Other conductive oxide transparent materials may be used, and other metals may be plated. These possibilities fall within the scope of the invention.

While portions of resist are conveniently formed in the above described manner and utilised for the protective regions 72' on the lines, it is envisaged that such regions could instead be formed otherwise, for example by depositing and patterning another suitable material, although this would add a further masking stage to the fabrication process.

Additional layers to those described may be provided, and there are various alternatives which will be apparent to those skilled in the art. The specific processing parameters and materials have not been described in detail in this application, as this invention relies upon known individual processing steps and materials. The steps, and the range of possible alternatives, will be apparent to those skilled in the art.

The specific example above uses amorphous silicon TFTs in the active plate of the LCD, but other semiconductor arrangements are possible, such as polycrystalline or microcrystalline.

In the specific example described, bottom gate transistors are used, but top gate transistors may also be used. In fact, the invention can be applied to any pixellated device in which a transparent pixel electrode is required and where there may be benefit in combining the deposition of the layer defining the pixel electrode with line (row or column) conductors.

The invention has been described in detail when applied to an active matrix LCD. The invention can also be applied for example to passive type LCDs, active matrix LED displays and to image sensors. The invention may be applied to any pixellated device requiring transparent pixel electrodes, where they may be benefit in defining row or column address lines using the same layer as for the pixel electrodes of the device. The invention can also be applied to transmissive and reflective active matrix LCD displays. In the case of reflective displays, it may still be desirable to use a transparent layer as ITO has well known benefits for forming the source and drain contacts.

In the examples described above, a transmissive display is shown, and the pixel electrode is shielded from the plating operation. For a reflective display, the pixel electrode may be plated together with the column conductors. In this case, the lines 32 and pixel electrodes may again be electroplated with metal in a second electroplating process after the photoresist regions 72' have been removed which builds upon the previously formed plating and also covers the newly-exposed surface areas of the line 32.

From reading the present disclosure, other modifications will be apparent to persons skilled in the art. Such modifications may involve other features which are already known in the field of active matrix liquid crystal displays and the like and which may be used instead of or in addition to features already described herein.

What is claimed is:

1. A method of improving electrical conductivity of lines of transparent conducting material carried on a substrate, comprising:
    forming the lines of transparent conducting material on the substrate;
    providing on the upper surface of each of the lines a covering layer extending from an end part of the line and partially covering the upper surface of the line; and
    subjecting the lines to a metal electroplating process in which a plating potential is applied to each line at the end part whereby a metal layer is plated on the exposed surface area of the line, the covering layer serving to shield the underlying surface of the line during the plating.

2. The method of claim 1, wherein the covering layer is shaped such that the exposed surface of the line increases progressively away from the end part.

3. The method of claim 2, wherein the covering layer tapers in width away from the end part.

4. The method of claim 3, wherein the step of forming the lines comprises:
    depositing a layer of transparent conducting material over the substrate,
    depositing a photoresist layer over the layer of transparent conducting material and patterning the photoresist into a configuration corresponding to the desired lines, and
    patterning the transparent conducting layer using the photoresist to leave the lines of transparent conducting material.

5. The method of claim 2, wherein the covering layer is stepped in width along the line.

6. The method of claim 5, wherein the step of forming the lines comprises:
    depositing a layer of transparent conducting material over the substrate,
    depositing a photoresist layer over the layer of transparent conducting material and patterning the photoresist into a configuration corresponding to the desired lines, and
    patterning the transparent conducting layer using the photoresist to leave the lines of transparent conducting material.

7. The method of claim 2, wherein the step of forming the lines comprises:
    depositing a layer of transparent conducting material over the substrate,
    depositing a photoresist layer over the layer of transparent conducting material and patterning the photoresist into a configuration corresponding to the desired lines, and
    patterning the transparent conducting layer using the photoresist to leave the lines of transparent conducting material.

8. The method of claim 1, wherein the covering layer extends from both ends of the line in similar manner and the plating potential is applied at both ends of the line during the plating process.

9. The method of claim 1, wherein the covering layer comprises photoresist.

10. The method of claim 1, wherein the step of forming the lines comprises:
    depositing a layer of transparent conducting material over the substrate,
    depositing a photoresist layer over the layer of transparent conducting material and patterning the photoresist into a configuration corresponding to the desired lines,
    patterning the transparent conducting layer using the photoresist to leave the lines of transparent conducting material.

11. The method of claim 10, wherein the photoresist layer is patterned into portions corresponding to the desired lines with each portion including a selected region having a first thickness and conforming with the form of the required covering layer with the remainder of the portion being of reduced thickness, and after patterning the transparent conducting layer the photoresist is partially etched to remove the areas of reduced thickness while leaving photoresist at the selected region which photoresist constitutes the covering layer.

12. The method of claim 11, and for use in the manufacture of a pixellated device comprising pixel electrodes of transparent conducting material carried together with the conductive lines on the substrate, wherein the photoresist layer is patterned into a configuration corresponding also to the desired pixel electrodes, and wherein the transparent conducting layer is patterned using the photoresist to leave pixel electrode regions.

13. The method of claim 12, wherein photoresist is left over the pixel electrode regions during the electroplating process.

14. The method of claim 10, and for use in the manufacture of a pixellated device comprising pixel electrodes of transparent conducting material carried together with the conductive lines on the substrate, wherein the photoresist layer is patterned into a configuration corresponding also to the desired pixel electrodes, and wherein the transparent conducting layer is patterned using the photoresist to leave pixel electrode regions.

15. The method of claim 14, wherein photoresist is left over the pixel electrode regions during the electroplating process.

16. A method of forming an active plate for a pixellated device, comprising:

depositing and patterning a gate conductor layer over an insulating substrate;

depositing a gate insulator layer over the patterned gate conductor layer;

depositing a silicon layer over the gate insulator layer;

depositing a transparent conductor layer over the silicon layer;

depositing and patterning a photoresist layer over the transparent conductor layer having a configuration defining source and drain areas, pixel electrode areas and conductor line areas associated with the source or drain conductors;

patterning the transparent conductor layer using the photoresist to form source and drains, pixel electrodes and conductor lines;

defining the photoresist to leave a photoresist region on each conductor line extending from one end part of the line partially covering the surface of the line;

and selectively electroplating the exposed areas of the transparent conductor lines with a metallic layer with a plating potential being applied at the end part of each line.

17. The method of claim 10, wherein the photoresist layer is patterned into areas of different thicknesses at the conductor lines and wherein the step of defining the photoresist comprises partially etching the photoresist to remove the thinner areas.

18. The method of claim 17, wherein the photoresist is defined to leave on each line a similar photoresist region extending from the other end part and wherein the plating potential is applied also at that other end part.

19. The method of claim 16, wherein the photoresist is defined to leave on each line a similar photoresist region extending from the other end part and wherein the plating potential is applied also at that other end part.

20. An active matrix liquid crystal display device comprising an active plate made according to claim 16, a further substrate carrying an electrode structure spaced from the active plate, and liquid crystal disposed between the active plate and the further substrate.

* * * * *